June 13, 1950 R. C. ZUCKERMAN 2,511,091
METHOD OF GROWING AND CULTIVATING ASPARAGUS
Filed April 9, 1947
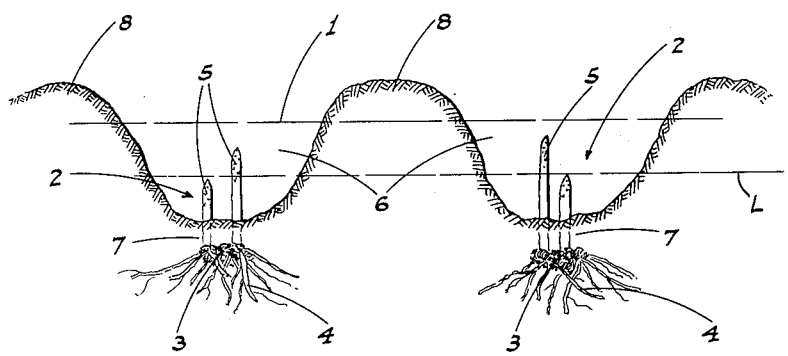
INVENTOR.
R. C. Zuckerman
BY
ATTYS Patented June 13, 1950

2,511,091

UNITED STATES PATENT OFFICE 2,511,091

METHOD OF GROWING AND CULTIVATING ASPARAGUS

Roscoe C. Zuckerman, Stockton, Calif.

Application April 9, 1947, Serial No. 740,323

1 Claim. (Cl. 47—58)

This invention is directed in general to an improved agricultural method.

One object of the present invention is to provide a novel method of growing and cultivating asparagus.

Another object of the invention is to provide a method, as above, which enhances the early season growth of the edible asparagus spears; this being very desirable as the early crop brings the best market price.

A further object of the invention is to provide a method of growing and cultivating asparagus which is effective to bring an asparagus planting to a maturity in one year which heretofore required at least three years; i. e. a one-year-old planting produces a crop equivalent to a three-year-old planting under other known methods.

It is also an object of this invention to provide an asparagus growing and cutting method which results in a longer commercially productive life for a planting of asparagus.

The figure of the drawing is a diagrammatic transverse section taken through adjacent asparagus rows grown and cultivated by the present method.

Referring now more particularly to the characters of reference on the drawing, the numeral 1 indicates the normal ground level of a cultivated asparagus field; asparagus conventionally being grown in transversely spaced, parallel extending rows, indicated generally at 2. The asparagus crowns 3, rooted as at 4, are planted, in spaced relation in each row 2, some fourteen inches or so below the normal ground level 1.

Under normal or conventional agricultural practice, the edible asparagus spears 5 are permitted to grow upward through the full fourteen inches of earth thereabove for harvesting, and sometimes must grow through longitudinal ridges formed by cultivation directly above each row.

The asparagus that brings the best price in the market is that which is harvested early in the harvest season, which is late winter or early spring. However, for the asparagus spears to grow early, as is desirable for the above reason, the soil has to heat from the sun through the full fourteen inches of earth to the crowns 3. This heating through such relatively thick layer of earth tends to delay early growth of the spears.

I therefore provide the following method of growing and cultivating asparagus:

The rooted crowns 3 are planted in the rows 2 the usual fourteen inches or so below the normal ground level 1, but the furrows 6 in which the crowns 3 are initially planted normally remain open except for a shallow layer of earth 7 in the bottom of such furrows directly above and covering the crowns 3.

As the bottom layer of earth 7 in each furrow 6 is shallow, it heats through relatively quickly, enhancing the growth of the asparagus, particularly immediately in advance of the start of the harvest season.

At the start of such season, and to facilitate harvesting of the spears 5 from the troughs or furrows 6, the latter are partially filled with loose earth up to a level, indicated generally by the line L, which line is nevertheless a substantial distance below the normal ground level 1. In other words, the asparagus grows at all times in a trough or furrow, the depth of the latter being decreased during the harvest season.

The furrowed-out earth may be deposited lengthwise intermediate the rows, as ridges 8, which ridges serve as windbreaks to shelter the spears 5.

It has also been ascertained that the above described method works to bring an asparagus crop into maturity much faster than with conventional practices. An asparagus planting which is one year old, grown and cultivated by the present method, will bear as much crop as a three year old planting by said conventional method.

After the harvest season is completed, the furrows 6 are worked out until only the shallow layer 7 of earth again remains; such furrows then existing in this substantially open condition until the following harvest season.

By growing the asparagus in a trough or furrow another advantage is accomplished. Under the conventional method wherein the asparagus is always fourteen inches or so under the ground, the asparagus crowns 3 gradually work upward year after year until at the end of ten or twelve years they are so near to the ground level that the planting must be abandoned. With the present method, wherein the crowns 3 are normally under only the shallow layer 7, there is no material tendency of said crowns to work upward, thus lengthening the commercial productive life of the planting.

From the foregoing description it will be readily seen that there has been produced such a method of growing and cultivating asparagus as will substantially fulfill the objects of the invention, as set forth herein.

While this specification sets forth in detail the present and preferred method of growing and cultivating asparagus, still in practice such deviations from such method may be resorted to as do not form a departure from the spirit of the invention, as defined by the appended claims.

Having thus described the invention, the following is claimed as new and useful, and upon which Letters Patent are desired:

That method of growing and cultivating asparagus from season to season consisting in the steps of establishing relatively deep troughs in the soil, such troughs being defined by side ridges above the normal ground level, initially planting the asparagus crowns in the soil at the bottom of the troughs and at a relatively shallow depth under the soil, covering the asparagus shoots with loose earth from the ridges after growth of the shoots begins, and to a point below the tops of the ridges, and removing substantially all the added soil after growth of asparagus shoots stops and then allowing the trough to remain open until growth of the asparagus shoots again begins in the next succeeding growing season.

ROSCOE C. ZUCKERMAN.

REFERENCES CITED

The following references are of record in the file of this patent:

Thompson, "Gardener's Assistant" published 1878 in London, England; pages 152, 153, 154.